United States Patent
Takahashi et al.

(10) Patent No.: US 6,239,246 B1
(45) Date of Patent: May 29, 2001

(54) ACRYLIC FUNCTIONAL ORGANOPOLYSILOXANES AND RADIATION-CURABLE COMPOSITIONS

(75) Inventors: Masatoshi Takahashi; Toshio Ohba, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/361,186

(22) Filed: Jul. 27, 1999

(30) Foreign Application Priority Data

Jul. 31, 1998 (JP) .................................................. 10-230286

(51) Int. Cl.[7] ................................................... C08G 77/20
(52) U.S. Cl. ................................. 528/32; 528/15; 528/31; 522/99; 428/447
(58) Field of Search ................................. 522/99; 528/15, 528/31, 32; 428/447

(56) References Cited

U.S. PATENT DOCUMENTS 4,585,669  *  4/1986  Eckberg .
5,982,041  *  11/1999  Mitani et al. .

FOREIGN PATENT DOCUMENTS 7316517    12/1995   (JP) .

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

A novel acrylic functional organopolysiloxane is obtained by effecting addition reaction between (A) an organopolysiloxane having acrylic functional groups and (B) an organopolysiloxane having a hydride group at either end to induce partial crosslinking. The acrylic functional organopolysiloxane forms a cured film ensuring light release and good retention of adhesion.

7 Claims, No Drawings

ACRYLIC FUNCTIONAL ORGANOPOLYSILOXANES AND RADIATION-CURABLE COMPOSITIONS

This invention relates to acrylic functional organopolysiloxanes useful as a main component in back coating agents for adhesive tapes and release paper coating agents for adhesive labels, and radiation-curable compositions comprising the same.

BACKGROUND OF THE INVENTION

One common approach taken for the purpose of preventing adhesion and bond between a substrate such as paper, converted paper or plastic film and a pressure-sensitive adhesive material is to apply a curable silicone composition onto the substrate surface and cure the coating with heat, UV or electron beams. The coated substrate is generally known as a release sheet.

The composition from which a releasable cured film is formed is required to cure at a low temperature and within a short time from the standpoints of productivity and energy saving and also in consideration of its application to less heat resistant substrates. Especially from the standpoint of preventing the substrate from deforming by heat, it is advantageous to cure a coating with radiation such as electron beams or ultraviolet rays into a cured film.

One useful method for preparing a composition for forming a releasable cured film is to cure an organopolysiloxane having (meth)acrylate groups by irradiating electron beams. The release of a cured film from a tacky material depends on the (meth)acrylate group content of the (meth)acrylate group-containing organopolysiloxane. The cured film requires a greater peeling force as the content of (meth)acrylate groups increases.

On the other hand, at least a certain amount of (meth)acrylate groups is necessary in order to quickly form a cured film. No cured film can be formed if the (meth)acrylate group content is reduced. Also, (meth)acrylate groups contribute to the phenomenon that a cured film firmly bonds to the substrate. An organopolysiloxane having a reduced (meth)acrylate group content cannot form a releasable film on the substrate because the cured film will readily separate from the substrate.

As understood from the foregoing, the releasable cured film involves contradictory release, cure, and substrate bond behaviors. It is difficult to find a compromise between light peeling and formation of a satisfactory cured film.

JP-A 7-316517 discloses that a cured film ensuring light peeling and age stability is obtainable by mixing an organopolysiloxane having (meth)acrylate groups with a non-reactive organopolysiloxane. In this cured film, however, the non-reactive organopolysiloxane which has not been incorporated in the crosslinked structure migrates from the surface of the cured film to a surface in contact therewith, detracting from the residual bonding force and ball tack, that is, the tack of a self-adhesive layer.

SUMMARY OF THE INVENTION

An object of the invention is to provide an acrylic functional organopolysiloxane which offers light release and good retention of adhesion and is radiation curable. Another object of the invention is to provide a radiation-curable composition comprising the same.

The invention provides an acrylic functional organopolysiloxane obtained by effecting addition reaction between (A) an organopolysiloxane having acrylic functional groups and (B) an organopolysiloxane having a hydride (SiH) group at either end to induce partial crosslinking. This acrylic functional organopolysiloxane is useful as a main component in back coating agents for adhesive tapes and release paper coating agents for adhesive labels. A radiation-curable composition comprising the organopolysiloxane as a main component is lightly releasable, ensures good retention of adhesion, and upon exposure to radiation, forms a cured film.

DESCRIPTION OF THE PREFERRED EMBODIMENTS

The acrylic functional organopolysiloxane of the invention is obtained by effecting addition reaction between (A) an organopolysiloxane having acrylic functional groups and (B) an organopolysiloxane having a hydride group at either end to induce partial crosslinking.

The organopolysiloxane (A) is preferably an organopolysiloxane having acrylic functional groups represented by the following average compositional formula (1):

$$A_x R^1_y SiO_{(4-x-y)/2} \quad (1)$$

wherein A is $-R^2OCOCR^3=CH_2$ or $-OR^2OCOCR^3=CH_2$ wherein $R^2$ is an alkylene group of 1 to 10 carbon atoms, and $R^3$ is hydrogen or methyl; $R^1$, which may be the same or different, is a monovalent hydrocarbon group, of 1 to 10 carbon atoms; x is from 0.002 to 1.50, y is 0 to 3.0, and the sum of x and y is from 1.5 to 2.5.

Preferred examples of the $C_1$–$C_{10}$ alkylene group represented by $R^2$ are methylene, ethylene and propylene groups.

The groups represented by $R^1$ are substituted or unsubstituted monovalent $C_1$–$C_{10}$ hydrocarbon groups, for example, alkyl groups such as methyl, ethyl, propyl and butyl, cycloalkyl groups such as cyclohexyl, aryl groups such as phenyl and tolyl, aralkyl groups such as benzyl and phenylethyl, and substituted ones of these groups in which some or all of the hydrogen atoms attached to carbon atoms are replaced by hydroxyl groups, cyano groups or halogen atoms, such as hydroxypropyl, cyanoethyl, 1-chloropropyl and 3,3,3-trifluoropropyl. Alkyl and aryl groups are desirable as $R^1$ groups when the release of the acrylic functional organopolysiloxane in the cured state is taken into account.

Among the organopolysiloxanes of formula (1), those of the following formulae (3) to (7) are preferred.

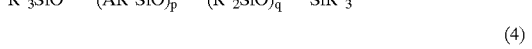

$$R^1_3SiO\text{—}(AR^1SiO)_{\overline{p}}\text{—}(R^1_2SiO)_{\overline{q}}\text{—}SiR^1_3 \quad (3)$$

$$AR^1_2SiO\text{—}(AR^1SiO)_{\overline{p}}\text{—}(R^1_2SiO)_{\overline{q}}\text{—}SiR^1_2A \quad (4)$$

$$\overline{(AR^1SiO)_{\overline{p}}\text{—}(R^1_2SiO)_{\overline{q}}} \quad (5)$$

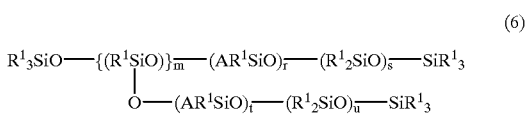

$$R^1_3SiO\text{—}\{(R^1SiO)\}_{\overline{m}}\text{—}(AR^1SiO)_{\overline{r}}\text{—}(R^1_2SiO)_{\overline{s}}\text{—}SiR^1_3 \quad (6)$$
$$| $$
$$O\text{—}(AR^1SiO)_{\overline{t}}\text{—}(R^1_2SiO)_{\overline{u}}\text{—}SiR^1_3$$

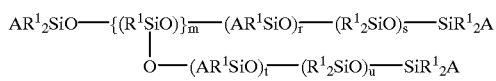

$$AR^1{}_2SiO\!-\!\{(R^1SiO)\}_{\overline{m}}\!-\!(AR^1SiO)_{\overline{r}}\!-\!(R^1{}_2SiO)_{\overline{s}}\!-\!SiR^1{}_2A \\ \phantom{AR^1{}_2SiO\!-\!\{\,}O\!-\!(AR^1SiO)_{\overline{t}}\!-\!(R^1{}_2SiO)_{\overline{u}}\!-\!SiR^1{}_2A \qquad (7)$$

In formulae (3) to (7), p is an integer of at least 2, preferably 2 to 100 and more preferably 2 to 50, q is an integer of at least 0, preferably 0 to 1,000 and more preferably 0 to 500. Letters r and t are integers of at least 0 and the sum of r+t is an integer of at least 2, preferably 2 to 100 and more preferably 2 to 50; s and u are integers of at least 0 and the sum of s+u is an integer of at least 0, preferably 0 to 2,000 and more preferably 0 to 1,000; and m is an integer of 0 to 3.

The organopolysiloxane (A) generally has a viscosity of 10 to 10,000 centistokes at 25° C. and preferably 50 to 1,000 centistokes at 25° C.

Specific examples of the organopolysiloxane (A) are given below.

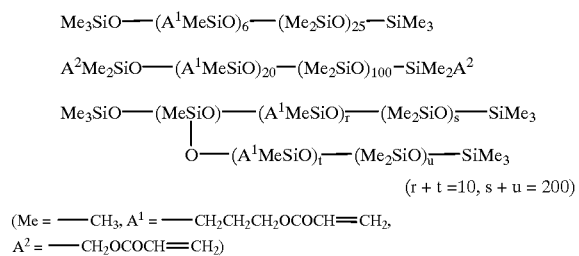

$$(r+t=10, s+u=200)$$

$(Me = \!-\!CH_3, A^1 = \!-\!CH_2CH_2CH_2OCOCH\!=\!CH_2,$
$A^2 = \!-\!CH_2OCOCH\!=\!CH_2)$

The organopolysiloxane (A) may be used alone or in admixture of two or more.

The organopolysiloxane having a hydride group at either end (B) is preferably one represented by the following average compositional formula (2):

$$H(R_2SiO)_nSiR_2H \qquad (2)$$

wherein R, which may be the same or different, is a monovalent hydrocarbon group of 1 to 10 carbon atoms, and n is a positive number so that the organopolysiloxane has a viscosity of 1 to 1,000,000 centistokes at 25° C.

Illustrative of the groups represented by R are substituted or unsubstituted monovalent $C_1$–$C_{10}$ hydrocarbon groups, for example, alkyl groups such as methyl, ethyl, propyl and butyl, cycloalkyl groups such as cyclohexyl, aryl groups such as phenyl and tolyl, and substituted ones of these groups in which some or all of the hydrogen atoms attached to carbon atoms are replaced by hydroxyl groups, cyano groups or halogen atoms, such as hydroxypropyl, cyanoethyl, 1-chloropropyl and 3,3,3-trifluoropropyl. Alkyl and aryl groups are desirable as R groups when the release of the acrylic functional organopolysiloxane in the cured state is taken into account. Further preferably, at least 80 mol % of the R groups in the entire siloxane units are methyl groups. The letter n is a positive number, preferably at least 2, so that the organopolysiloxane has a viscosity of 1 to 1,000,000 centistokes, especially 50 to 1,000 centistokes at 25° C.

Illustrative examples of the organopolysiloxane (B) are given below.

$H(Me_2SiO)_{50}SiMe_2H$
$H(Me_2SiO)_{100}SiMe_2H$
$H(Me_2SiO)_{200}SiMe_2H$
$H(Me_2SiO)_{100}(Ph_2SiO)_{20}SiMe_2H$

Herein, Me is methyl and Ph is phenyl.

The organopolysiloxane (B) may be used alone or in admixture of two or more.

For reaction, the organopolysiloxane having acrylic functional groups (A) and the organopolysiloxane having a hydride group at either end (B) are preferably used in a molar ratio (B)/(A) from 99/1 to 5/95 and especially from 98/2 to 20/80. An excessive amount of the organopolysiloxane (B) would result in losses of light release and slip whereas a too less amount of the organopolysiloxane (B) would result in losses of cure and adhesion retention. The number of molecules of the acrylic functional group-containing organopolysiloxane (A) is preferably at least 2 times, more preferably 2 to 100 times the number of molecules of the hydride group-containing organopolysiloxane (B). Further preferably, the organopolysiloxanes (A) and (B) are used such that the molar ratio of $CH_2\!=\!CR^3$ groups/hydride groups (SiH groups) is at least 2, and especially from 2 to 100.

The acrylic functional organopolysiloxane according to the invention is obtained by effecting addition reaction between the organopolysiloxanes (A) and (B) to induce partial crosslinking. For the addition reaction, catalysts are used. Preferred addition reaction catalysts are platinum catalysts including chloroplatinic acid, alcohol solutions of chloroplatinic acid, reaction products of chloroplatinic acid with alcohols, reaction products of chloroplatinic acid with olefinic compounds, and reaction products of chloroplatinic acid with vinyl-containing siloxanes. Other common addition reaction catalysts such as rhodium and ruthenium catalysts are also useful. The amount of the catalyst added is not critical although an appropriate amount is 0.01 to 10% of the weight of the acrylic functional group-containing organopolysiloxane (A) and the hydride group-containing organopolysiloxane (B) combined. Differently stated, an appropriate amount of the catalyst is such that the molar ratio of SiH groups/Pt (or Rh or Ru) is from $10^2/1$ to $10^6/1$.

Addition reaction may be effected at room temperature to 300° C. Heating above 50° C. will promote the reaction. At too high temperatures, acrylic functional groups can polymerize to form a gel. Reaction temperatures below 150° C. are preferred in this sense. The reaction time is not critical although a time of 1 to 10 hours is preferred.

Optionally addition reaction is carried out in a solvent. Exemplary solvents are aromatic solvents such as toluene and xylene, aliphatic solvents such as hexane and octane, ketone solvents such as methyl ethyl ketone and methyl isobutyl ketone, ester solvents such as ethyl acetate and isobutyl acetate, ether solvents such as diisopropyl ether and 1,4-dioxane, and mixtures of any of these solvents. The use of a solvent or a mixture of solvents in which the acrylic group-containing organopolysiloxane (A) and the hydride group-containing organopolysiloxane (B) are soluble is necessary for addition reaction to proceed efficiently. Upon reaction, a stabilizer for preventing radical polymerization of acrylic functional groups is added if desired.

As mentioned above, the acrylic functional organopolysiloxane according to the invention is obtained by effecting addition reaction between the organopolysiloxane having acrylic functional groups (A) and the organopolysiloxane having a hydride (SiH) group at either end (B) to induce partial crosslinking. Some of the acrylic functional groups on the organopolysiloxane (A) add to the hydride (SiH) groups at both ends of the organopolysiloxane (B), with the non-added acrylic functional groups on the organopolysiloxane (A) being left behind. In the entire siloxane units of the acrylic functional organopolysiloxane according to the invention, the proportion of acrylic group-containing siloxane units is preferably 2 to 40 mol %, and more preferably 5 to 25 mol %. An organopolysiloxane with less than 2 mol % of acrylic group-containing siloxane units would be short in cure and adhesion retention whereas light release and slip would become insufficient in excess of 40 mol %.

Illustrative examples of the acrylic functional organopolysiloxane according to the invention are those of the following formulae (8) to (13).

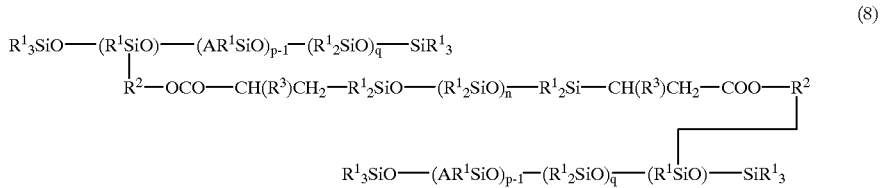
(8)

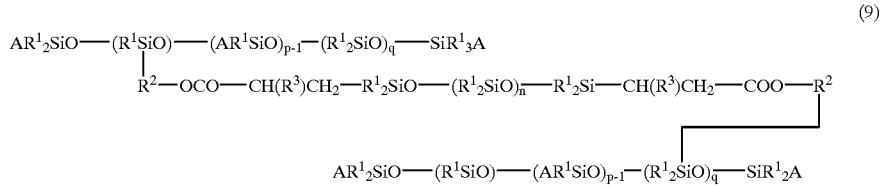
(9)

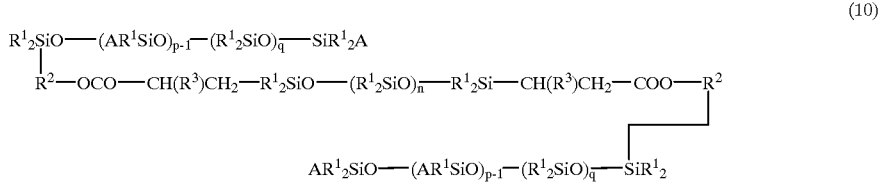
(10)

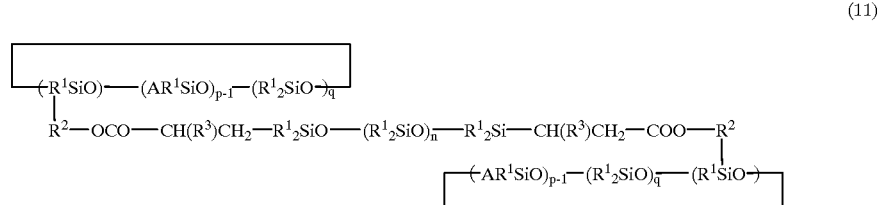
(11)

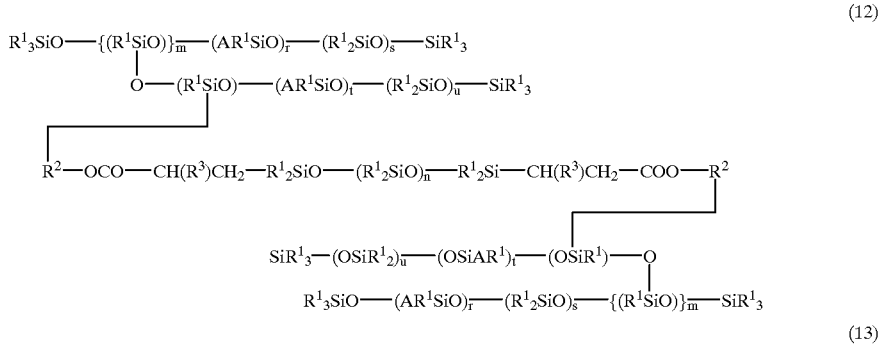
(12)

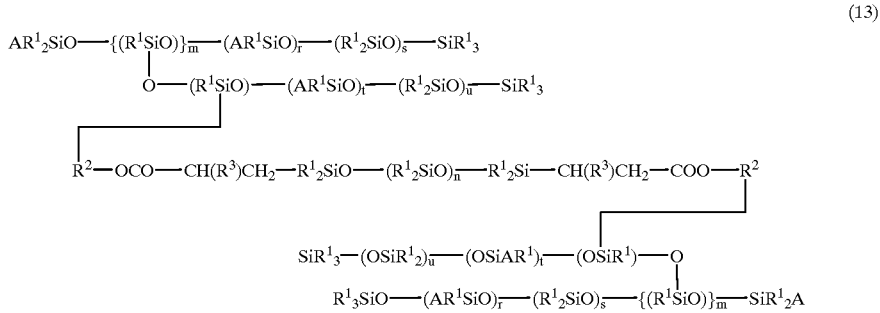
(13)

More specific examples of the acrylic functional organopolysiloxane are those of the following formulae (14) to (17).

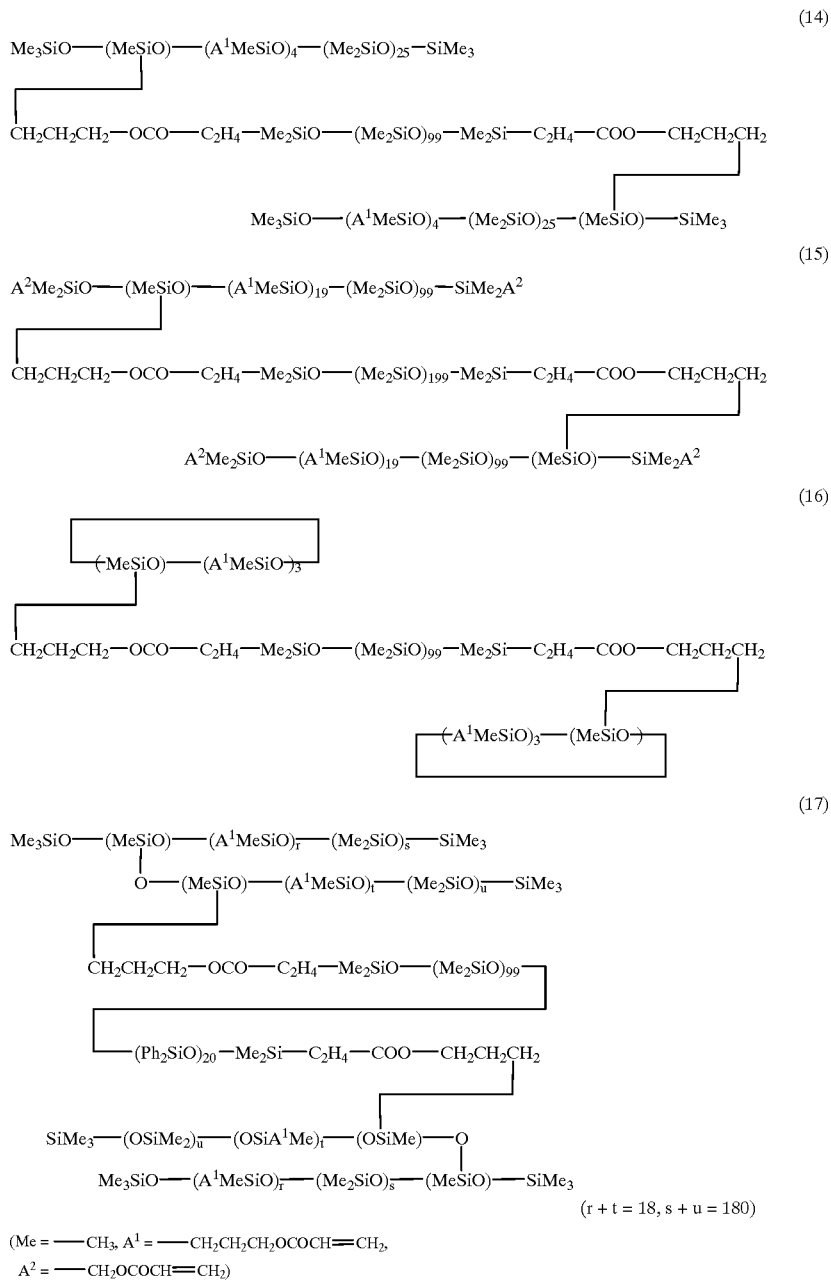

The acrylic functional organopolysiloxane according to the invention may be used alone or in combination with another acrylic group-containing organopolysiloxane having a different degree of polymerization to formulate a radiation-curable organopolysiloxane composition. The composition is obtained by uniformly mixing predetermined amounts of the respective components. If necessary, organic resins such as acrylate oligomers, agents for modifying adhesion to substrates, leveling agents, antistatic agents, anti-foaming agents, pigments and other types of organopolysiloxanes may be added. On use, the composition may be diluted with organic solvents.

Adding a photopolymerization initiator to the composition yields a UV radiation-curable organopolysiloxane composition. Useful photo-initiators include initiators of the ring opening type, for example, acetophenone compounds such as 2-hydroxy-2-methyl-1-phenylpropan-1-one, 1-(4-isopropylphenyl)-2-hydroxy-2-methylpropan-1-one, 1-hydroxycyclohexylphenylketone, and 2,2-dimethoxy-2-phenylacetophenone, 2-methyl-[4-(methylthio)phenyl]-2-morpholino-1-propanone, benzoyl diphenyl phosphine oxide, and benzoin ether compounds such as benzoin isopropyl ether and benzoin isobutyl ether; initiators of the hydrogen abstraction type, for example, benzophenone, 2-isopropylthioxanthone, and 2-ethylanthraquinone. The amount of the initiator added may be 0.1 to 10 parts, desirably 1 to 5 parts by weight, per 100 parts by weight of the radical-polymerizable organopolysiloxane. Less than 0.1 part of the initiator would fail to achieve a cure rate whereas more than 10 parts would detract from shelf stability.

Examples of the substrate to which the organopolysiloxane composition according to the invention is applied include plastic films and sheets made of synthetic resins such as polyesters, polypropylene, polyethylene, polyvinyl chloride, polytetrafluoroethylene and polyimides, paper sheets such as glassine paper, kraft paper and clay coated paper, and laminated paper sheets such as polyethylene laminated wood-free paper and polyethylene laminated kraft paper.

In applying the composition to the substrate, any of well-known techniques such as roll coating, gravure coating, wire doctor coating, air knife coating and dip coating may be used. A coating weight of 0.01 to 20.0 g/m² is appropriate.

Upon exposure to radiation, the coating cures into a cured film. Examples of effective radiation include electron beams, α-rays, β-rays, γ-rays, and ultraviolet rays emitted from mercury arc lamps, medium-pressure mercury lamps, high-pressure mercury lamps, and metal halide lamps. The dose of radiation necessary to cure the coating may be about 1 to 10 Mrad for electron beams. In the case of UV radiation, the organopolysiloxane composition to which a photopolymerization initiator has been added is exposed for 0.01 to 10 seconds under a 2-kW high-pressure mercury lamp (80 W/cm) at a distance of 8 cm.

EXAMPLE

Examples of the invention are given below by way of illustration and not by way of limitation. All parts are by weight. Physical properties are measurements obtained by the following tests.

Peeling Force

An organopolysiloxane composition was applied onto an OPP web to a coating weight of 1.0 g/m². The EB curing equipment used was an electron beam processor C-150 by ESI, which was operated at an accelerating voltage of 165 kV. With electron beams, the coating was cured at a dose of 3 Mrad and an oxygen concentration below 100 ppm. The cured film was aged at 25° C. for 20 hours. To the surface of this cured film, a hot-melt adhesive coated kraft tape strip (5 cm wide) was attached. The test assembly was aged at 50° C. for 20 hours. Using a tensile tester, the tape strip was peeled from the OPP web at an angle of 180° and a pulling rate of 0.3 m/min. A force (gf/5 cm) needed to peel the tape strip was measured.

Retention of Adhesion

Like the peeling force test, a cured film of an organopolysiloxane composition was formed on an OPP web and aged. An adhesive tape strip Nitto No. 31B (trade name, Nitto Denko K.K.) was attached to the surface of the cured film. With a load of 20 g/cm² rested thereon, this assembly was heat treated at 70° C. for 20 hours. The tape strip was peeled from the web and then attached to a stainless steel plate. A force (gf/2.5 cm) needed to peel the tape strip from the stainless steel plate was measured. A percentage of this force relative to a force needed to peel the standard adhesive tape strip (untreated) was calculated. This is a percent retention of adhesion.

Example 1

A four-necked flask equipped with a stirrer, thermometer, reflux condenser, and dropping funnel was charged with 62.3 parts of toluene, 113 parts of an acrylate group-containing organopolysiloxane represented by the average compositional formula:

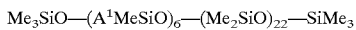

wherein Me is —CH$_3$ and A$^1$ is —CH$_2$CH$_2$CH$_2$OCOCH=CH$_2$, 0.934 part of 2,6-tert-butyl-4-methylphenol and 0.037 part of N,N'-diphenyl-1,4-phenylenediamine as polymerization inhibitors.

To the flask was added 3.12 parts of a 2% toluene solution of a platinum catalyst. The flask was heated to 80° C. whereupon 73.9 parts of an organopolysiloxane having hydride groups at both ends was added dropwise over one hour. This organopolysiloxane was represented by the following formula:

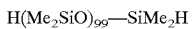

and had a viscosity of 120 centipoises at 25° C.

After the completion of dropwise addition, the reaction solution was stirred for 4 hours at 90° C. The reaction solution was allowed to cool to room temperature, and with 25.0 parts of activated carbon added, stirred overnight. After the activated carbon was removed by filtration, the toluene and volatiles were distilled off at 80° C. and 2 Torr. There was obtained 159 parts of Sample 1 represented by the following formula. Sample 1 had a viscosity of 293 centipoises and a refractive index of 1.417, and the conversion of terminal hydride groups was 100%. On analysis by GPC and $^{29}$Si NMR, Sample 1 was identified to be a composition consisting of a crosslinked product (X) and a non-crosslinked product (Y) in a weight ratio X/Y of 70/30. Although this sample is deemed to contain some products of crosslinked acrylic groups, the crosslinked product (X) is mainly of the following structure and the non-crosslinked product (Y) is of the following structure.

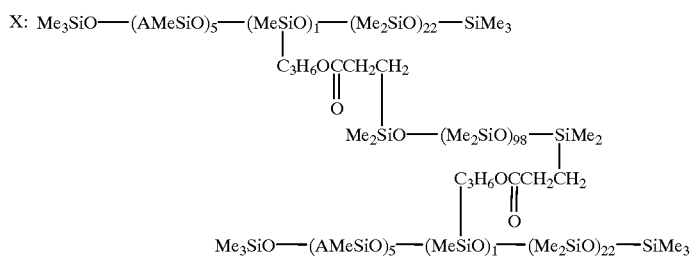

The peeling force and adhesion retention of a film obtained by curing the organopolysiloxane were measured by the above tests, with the results shown in Table 1.

Comparative Example 1

Sample 2 was obtained by mixing 113 parts of the acrylate group-containing organopolysiloxane and 73.9 parts of the organopolysiloxane having hydride groups at both ends, which were the same as used in Example 1. This composition did not cure under the irradiating conditions of the test. The peeling force and adhesion retention of this composition were measured by the above tests, with the results shown in Table 1.

Comparative Example 2

Sample 3 was an acrylate group-containing organopolysiloxane of the average compositional formula:

$$A^2Me_2SiO\text{—}(A^1MeSiO)_{18}\text{—}(Me_2SiO)_{80}\text{—}SiMe_2A^2$$

wherein Me is $-CH_3$, $A^1$ is $-CH_2CH_2CH_2OCOCH=CH_2$, and $A^2$ is $-CH_2OCOCH=CH_2$. The peeling force and adhesion retention of a cured film of the organopolysiloxane were measured by the above tests, with the results shown in Table 1.

Example 2

A composition was obtained by mixing 20 parts of Sample 1 with 80 parts of Sample 3. The peeling force and adhesion retention of a cured film of the composition were measured by the above tests, with the results shown in Table 1.

Example 3

A composition was obtained by mixing 10 parts of Sample 1 with 90 parts of Sample 3. The peeling force and retention of adhesion of a cured film of the composition were measured by the above tests, with the results shown in Table 1.

Comparative Example 3

A composition was obtained by mixing 20 parts of Sample 2 with 80 parts of Sample 3. This composition was repellent on the web and failed to provide a smooth surface upon curing. The peeling force and adhesion retention of a cured film of the composition were measured by the above tests, with the results shown in Table 1.

Comparative Example 4

A composition was obtained by mixing 20 parts of an acrylate group-containing organopolysiloxane with 80 parts of Sample 3. The peeling force and adhesion retention of a cured film of the composition were measured by the above tests, with the results shown in Table 1. The acrylate group-containing organopolysiloxane used herein has an approximately equal acrylic equivalent to Samples 1 and 2 and is represented by the following average compositional formula.

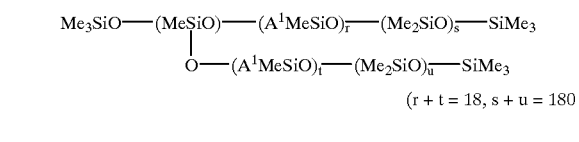

(r + t = 18, s + u = 180)

(Me = $-CH_3$, $A^1$ = $-CH_2CH_2CH_2OCOCH=CH_2$)

TABLE 1

|   | Peeling force (gf/5 cm) | Retention of adhesion (%) |
|---|---|---|
| Example 1 | 9 | 88 |
| Example 2 | 48 | 93 |
| Example 3 | 98 | 98 |
| Comparative Example 1 | 3 | 70 |
| Comparative Example 2 | 450 | 98 |
| Comparative Example 3 | 48 | 70 |
| Comparative Example 4 | 270 | 98 |

There have been described acrylic functional organopolysiloxanes which will form releasable cured films ensuring light release and good retention of adhesion.

Japanese Patent Application No. 10-230286 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An acrylic functional organopolysiloxane obtained by effecting addition reaction between (A) an organopolysiloxane having acrylic functional groups and (B) an organopolysiloxane having a hydride group at either end to induce partial crosslinking, wherein some of the acrylic functional groups on the organopolysiloxane (A) add to the hydride (SiH) groups at both ends of the organopolysiloxane (B), with the non-added acrylic functional groups on the organopolysiloxane (A) being left behind so that the proportion of acrylic group-containing siloxane units is 2 to 40 mol % in the entire siloxane units of the acrylic functional organopolysiloxane.

2. The organopolysiloxane of claim 1 wherein the organopolysiloxane (A) is an organopolysiloxane having acrylic functional groups represented by the following average compositional formula (1):

$$A_xR^1_ySiO_{(4-x-y)/2} \tag{1}$$

wherein A is $-R^2OCOCR^3=CH_2$ or $-OR^2OCOCR^3=CH_2$ wherein $R^2$ is an alkylene group of 1 to 10 carbon atoms, and $R^3$ is hydrogen or methyl, $R^1$ is independently a monovalent hydrocarbon group of 1 to 10 carbon atoms, x is from 0.002 to 1.50, y is 0 to 3.0, and the sum of x and y is from 1.5 to 2.5.

3. The organopolysiloxane of claim 1 wherein the organopolysiloxane (B) is an organopolysiloxane having a hydride group at either end represented by the following average compositional formula (2):

$$H(R_2SiO)_nSiR_2H \tag{2}$$

wherein R is independently a monovalent hydrocarbon group of 1 to 10 carbon atoms, and n is a positive number so that the organopolysiloxane has a viscosity of 1 to 1,000,000 centistokes at 25° C.

4. A radiation-curable composition comprising the acrylic functional organopolysiloxane of claim 1 as a main component.

5. The composition of claim 4 further comprising a photo-initiator.

6. The organopolysiloxane of claim 1, wherein the organopolysiloxane (A) is selected from the group consisting of formulae (3), (4), (5), (6), and (7):

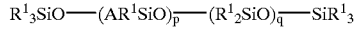
(3)

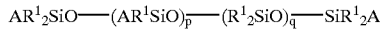
(4)

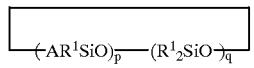
(5)

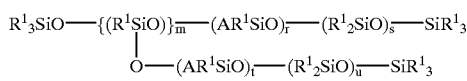
(6)

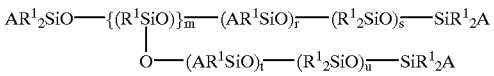
(7)

wherein A is —$R^2OCOCR^3$=$CH_2$ or —$R^2OCOCR^3$=$CH_2$, wherein $R^2$ is an alkylene group of 1 to 10 carbon atoms, and $R^3$ is hydrogen or methyl group, $R^1$ is independently a monovalent hydrocarbon group of 1 to 10 carbon atoms, p is an integer of at least 2, q is an integer of at least 0, r and t are integers of at least 0 and the sum of r+t is an integer of at least 2, s and u are integers of at least 0 and the sum of s+u is an integer of at least 0, and m is an integer of 0 to 3.

7. The organopolysiloxane of claim 1, wherein the acrylic functional organopolysiloxane is selected from the group consisting of formulae (8), (9), (10), (11), (12), and (13):

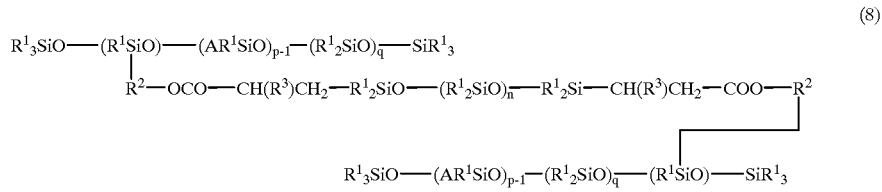
(8)

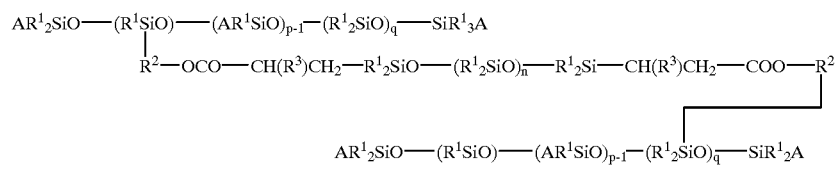
(9)

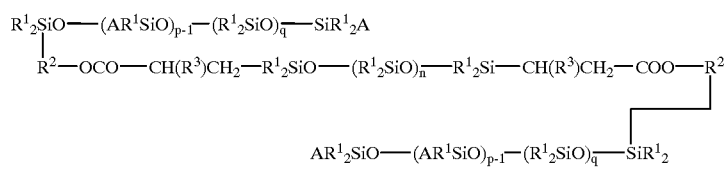
(10)

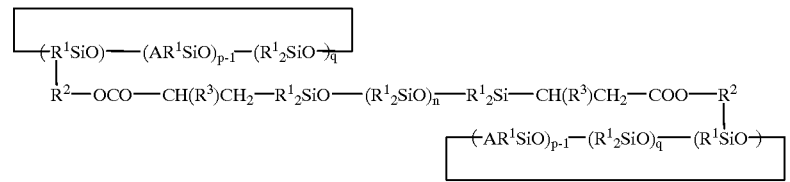
(11)

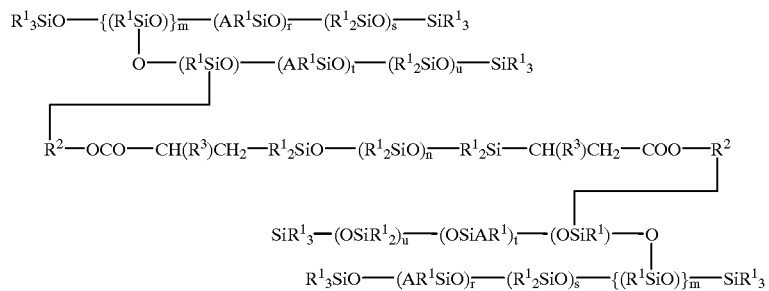
(12)

(13)

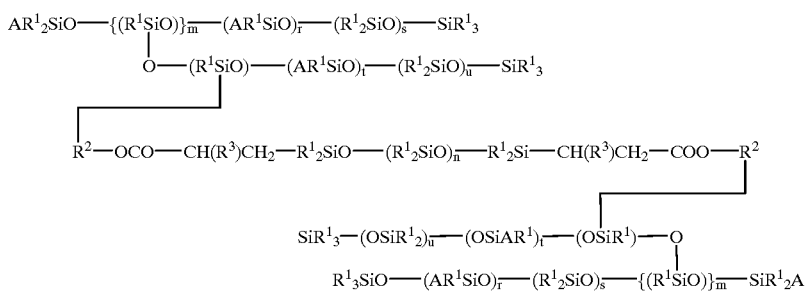

wherein A is $-R^2OCOCR^3=CH_2$ or $-OR^2OCOCR^3=CH_2$, wherein $R^2$ is an alkylene group of 1 to 10 carbon atoms, and $R^3$ is hydrogen or methyl group, $R^1$ is independently a monovalent hydrocarbon group of 1 to 10 carbon atoms, p is an integer of at least 2, q is an integer of at least 0, r and t are integers of at least 0 and the sum of r+t is an integer of at least 2, s and u are integers of at least 0 and the sum of s+u is an integer of at least 0, and m is an integer of 0 to 3.

* * * * *